Patented July 21, 1942

2,290,154

UNITED STATES PATENT OFFICE 2,290,154

PROCESS FOR BREAKING PETROLEUM EMULSIONS

Charles M. Blair, Jr., Webster Groves, Mo., assignor to Petrolite Corporation, Ltd., Wilmington, Del., a corporation of Delaware No Drawing. Application June 27, 1940, Serial No. 342,717

13 Claims. (Cl. 252—344)

This invention relates primarily to the treatment of emulsions of mineral oil and water, such as petroleum emulsions, for the purpose of separating the oil from the water.

One object of my invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object of my invention is to provide an economical and rapid process for separating emulsions which have been prepared under controlled conditions from mineral oil, such as crude petroleum, and relatively soft waters or weak brines. Controlled emulsification and subsequent demulsification under the conditions just mentioned is of significant value in removing impurities, particularly inorganic salts, from pipeline oil.

I have found that the particular chemical compounds or reagents employed as the demulsifier in my herein described process for resolving petroleum emulsions, may also be used for other purposes, for instance, as a break inducer in doctor treatment of the kind intended to sweeten gasoline. See U. S. Patent No. 2,157,223, dated May 9, 1939, to Sutton. Said chemical compounds are also of value as surface tension depressants in the acidization of calcareous oil-bearing strata by means of strong mineral acid, such as hydrochloric acid. Similarly, some of said chemical compounds are effective as surface tension depressants or wetting agents in the flooding of exhausted oil-bearing strata.

As to using compounds of the kind herein described as flooding agents for recovering oil from subterranean strata, reference is made to the procedure described in detail in co-pending applications for patents Serial Numbers 322,534, 322,535, and 322,536, filed March 6, 1940, by Melvin De Groote and Bernhard Keiser which have matured into Patents 2,233,381 and 2,233,382, dated February 25, 1941, and 2,226,119 dated December 24, 1940. As to using compounds of the kind herein described as demulsifiers or in particular as surface tension depressants in combination with mineral acid for acidization of oil-bearing strata, reference is made to co-pending applications for patents Serial Numbers, 322,537 and 322,538, filed March 6, 1940, and 323,418, filed March 11, 1940, by Melvin De Groote and Bernhard Keiser which have matured into Patents 2,281,419 dated April 28, 1942; 2,233,383 dated February 25, 1941, and 2,278,838, dated April 7, 1942.

I have discovered that the basic amides of polyamines containing at least three amino nitrogen atoms are particularly effective as demulsifiers for oil field emulsions. Polyamines which are readily available as raw materials include diethylene triamine, tetraethylene pentamine, and triethylene tetramine. These are commonly referred to as ethylene polyamines and are considered as members of the broad class of alkylene polyamines. Ordinarily the word "polyamine" is employed to include diamines, as well as amines having three or more nitrogen atoms. Insofar that all the compounds herein contemplated are characterized by the fact that the polyamines must contain more than two nitrogen atoms, for the sake of simplicity and to avoid burdensome repetition, I will use the word "polyamine" both in the specification and in the hereto appended claims to mean polyamines having three or more nitrogen atoms, thus eliminating diamines from consideration, and eliminating from repeated use such burdensome language as "polyamine containing at least 3 amino nitrogen atoms."

The manufacture of such polyamines is well known. For instance, see U. S. Patent No. 1,951,992, dated March 20, 1934, to Perkins, and U. S. Patent No. 2,049,467, dated August 4, 1936, to Mnookin. As is well known, such compounds can be obtained by reactions involving reactants other than ethylene dichloride; for instance, propylene chloride or any higher alkylene dichloride may be employed.

Furthermore, as is well known, the formation of such polyamino compounds is not dependent upon the use of ammonia but may employ a primary amine. Obviously, the reaction may also employ a secondary amine; but the compound obtained solely from secondary amines, is valueless, because it cannot be acylated by an amidification reaction so as to yield an amide. One may, of course, employ mixtures of ammonia and primary amines. A secondary amine may be used in connection with ammonia or primary amines. As to other suitable reactants which may be substituted for ethylene dichloride in the manufacture of such polyamines, one may include the following: propylene dichloride, butylene dichloride, amylene dichloride, etc.

For the sake of simplicity I will limit my description to the particular species derived from polyamines obtained by reactions involving ethylene dichloride. Broadly speaking, this class may be typified by the following formula:

$$NH_2.C_2H_4.(C_2H_4.NH)_x.NH_2$$

where $x$ is a whole number, varying from 1 to 10, and preferably 2 to 4. The best and most effective demulsifiers are obtained when $x$ equals 2 or 3.

As has been previously stated, the compounds contemplated for use as demulsifiers are characterized by the presence of an acyl radical in an amide form. The acyl radical may be derived from any suitable high molecular weight carboxy acid. The expression "higher molecular weight carboxy acids" is an expression frequently employed to refer to certain organic acids, particularly monocarboxy acids, having more than 6 carbon atoms and generally less than 40 carbon atoms. The commonest examples include the detergent-forming acids, i. e., those acids which combine with alkalies to produce soap or soap-like bodies. The detergent-forming acids, in turn, include naturally-occurring fatty acids, resin acids, such as abietic acid, naturally-occurring petroleum acids, such as naphthenic acids, and carboxy acids produced by the oxidation of petroleum. As will be subsequently indicated, there are other acids which have somewhat similar characteristics and are derived from somewhat different sources and are different in structure, but can be included in the broad generic term previously indicated.

Among sources of such acids may be mentioned straight chain and branched chain, saturated and unsaturated, carboxylic, aliphatic, alicyclic, fatty, aromatic, hydroaromatic, and aralkyl acids, including caprylic acid, butyric acid, heptylic acid, caproic acid, capric acid, pimelic acid, sebacic acid, erucic acid, saturated and unsaturated higher molecular weight aliphatic acids, such as the higher fatty acids containing at least 8 carbon atoms, and including, in addition to those mentioned, melissic acid, stearic acid, oleic acid, ricinoleic acid, diricinoleic acid, triricinoleic acid, polyricinoleic acid, ricinostearolic acid, ricinoleyl lactic acid, acetylricinoleic acid, chloracetyl-ricinoleic acid, linoleic acid, linolenic acid, lauric acid, myristic acid, undecylenic acid, palmitic acid, mixtures of any two or more of the above mentioned acids or other acids, mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow soyabean oil, peanut oil, castor oil, seal oils, whale oil, shark oil, and other fish oils, teaseed oil, partially or completely hydrogenated animal and vegetable oils, such as those mentioned; hydroxy and alpha-hydroxy higher carboxylic, aliphatic and fatty acids, such as dihydroxystearic acid, dihydroxy palmitic acid, dihydroxybehenic acid, alphahydroxy capric acid, alphahydroxystearic acid, alphahydroxy palmitic acid, alphahydroxy lauric acid, alphahydroxy myristic acid, alphahydroxy cocoanut oil mixed fatty acids, alphahydroxy margaric acid, alphahydroxy arachidic acid, and the like; fatty and similar acids derived from various waxes, such as beeswax, spermaceti, montan wax, Japan wax, coccerin, and carnauba wax. Such acids include carnaubic acid, cerotic acid, lacceric acid, montanic acid, psyllastearic acid, etc. As suggested, one may also employ higher molecular weight carboxylic acids derived, by oxidation and other methods, from paraffin wax, petroleum and similar hydrocarbons; resinic and hydroaromatic acids, such as hexohydrobenzoic acid, hydrogenated naphthoic, hydrogenated carboxy diphenyl, naphthenic, and abietic; aralkyl and aromatic acids, such as benzoic acid, Twitchell fatty acids, naphthoic acid, carboxydiphenyl pyridine carboxylic acid, hydroxybenzoic acid, and the like.

Other suitable acids include phenylstearic acid, benzoylnonylic acid, campholic acid, fencholic acid, cetyloxybutyric acid, cetyloxyacetic acid, chlorstearic acid, etc.

In all instances the reactant employed to introduce an acyl radical from a higher molecular weight carboxy acid need not be the acid itself, but may be the ester, anhydride, amide, or any other suitable form.

The acylated polyamines of the kind herein contemplated as demulsifying agents must have present at least one strongly basic amino nitrogen atom, and preferably has present at least two strongly basic amino nitrogen atoms. It is known that nitrogen atoms which are directly linked to an aryl radical or to an acyl radical are substantially non-basic in character and ordinarily do not show any marked solubility in acid. Actually, aryl amines in general show weakly basic properties, but for the present discussion they may be considered as substantially non-basic. On the other hand, amino nitrogen atoms not directly linked to an acyl group and not directly linked to an aryl group, may be either strongly basic or mildly basic. The mildly basic amino radicals are characterized, of course, by freedom from directly linked aryl radicals and acyl radicals, but are characterized by being linked to a hydroxy hydrocarbon radical, such as an alkylol radical, or an esterified alkylol radical or its equivalent, including morpholine radicals. A strongly basic amino nitrogen atom, in many instances, may be characterized as being of the following type:

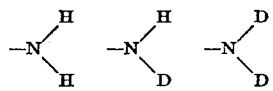

in which D represents a non-aryl hydrocarbon radical and is not intended to include oxyhydrocarbon radicals, or acylated oxyhydrocarbon radicals. Furthermore, DD jointly is not intended to represent a morpholine nucleus.

Thus, the compounds of the type herein contemplated must have present at least one strongly basic amino nitrogen atom, and preferably have present at least two such strongly basic amino nitrogen atoms. There must be present at least one amido nitrogen atom in which the acyl radical of the amide group is derived from a higher molecular weight carboxy acid of the kind above described. It is not intended to include the type of compound in which there are other amino nitrogen atoms which either are non-basic in character, such as a radical derived from an aryl amine, or which may be mildly basic in character, such as a radical derived from an alkylolamine or an esterified alkylolamine. There may be present non-basic amido radicals other than the kind described, to wit, amido radicals derived, for example, from an acid having less than 6 carbon atoms, as, for example, acetic acid, butyric acid, and the like.

However, regardless of the presence or absence of such other radicals, the acylated polyamine must always contain at least three amino nitrogen atoms, the word "amino" being employed in the broad sense in this instance to include both amino nitrogen atoms and amido nitrogen atoms; and at least one amino nitrogen atom must be of the strongly basic type; and preferably there should be present at least two amino nitrogen atoms of the strongly basic type. At least, one amido nitrogen atom must be linked to the acyl radical derived from a high molal carboxy acid. There is no intention to exclude the presence of more than one acyl radical derived from such higher molecular weight carboxy acid. Furthermore, it is to be noted that it is my preference to obtain such acyl radicals from monocarboxy detergent-forming acids of the kind above mentioned; and more particularly, I prefer to employ the fatty acid type. Specifically, the most suitable fatty acid is the hydroxylated type, and the most desirable specific example is ricinoleic acid.

Summarizing what has been said, the commonest type of acylated polyamine may be indicated by the following type formula:

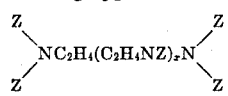

in which $x$ is a small whole number, such as one or more, as previously indicated; and Z is H, RCO, R'CO, or D, in which RCO represents an acyl radical derived from a higher molecular weight carboxy acid, and must occur at least once; and R'CO is an acyl radical derived from a lower molecular weight carboxy acid having six carbon atoms or less; D is an alkyl radical. Said amide is further characterized by the fact that at least one of the following radicals is present:

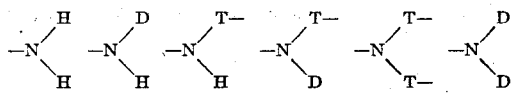

in which T is an alkylene radical; and D has its prior significance; and preferably at least two of the aforementioned basic amine radicals are present.

In view of what has been said previously, it is understood that in the broader aspect, the class which has just been described is a member of the genus in which any alkylene group such as propylene, butylene, amylene, or the like, may appear instead of the ethylene group. With this in mind, the previous formula may be rewritten as follows:

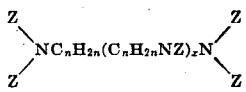

in which $n$ represents a relatively small number varying from 2 to 10, and in which all the other characters have their previous significance.

In the prior formula it is pointed out that Z may represent the radical D, which in turn is an alkyl radical. Dependent on the method of manufacture, a polyamine may contain an alkyl radical as produced. In other words, it may be derived from a primary or secondary amine, so as to have an alkyl radical present without necessity of a separate step for producing such alkyl radicals. For instance, the reaction involving an alkylene dichloride on one hand and a mixture of a secondary amine, and ethylene diamine, or the like, on the other hand, would produce a mixture of compounds, part of which would consist of a polyamine of the kind herein contemplated; and such polyamine would be additionally characterized by the presence of at least one amino nitrogen atom connected to two alkyl radicals. However, if desired, the polyamines as available can be alkylated in the manner commonly employed for alkylating ordinary amines, i. e., monoamines or diamines. For instance, alkylated products may be derived by reaction between alkyl chlorides, such as methyl chloride, propyl chloride, butyl chloride, amyl chloride, cetyl chloride, octadecyl chloride, and the like in conjunction with the selected polyamine. Such reaction products result in the formation of hydrochloric acid, and the resultant product consists of an amine hydrochloride. The conventional method for conversion into the base is to treat with dilute caustic solution. Alkylation is not limited to the introduction of an alkyl group; but as a matter of fact, a radical may be introduced characterized by the fact that the carbon atom chain is interrupted at least once by an oxygen atom. In other words, alkylation may be accomplished by compounds which are essentially alkyloxyalkyl chlorides, as, for example, the following:

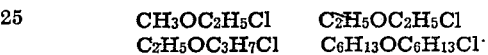

Similarly, chlorhydrins are available from polyglycerol, such as diglycerol and some polyglycols, such as diglycols, which are characterized by the fact that the carbon atom chain is interrupted more than once by oxygen. The compounds obtained by the introduction of such radicals which contain a carbon atom chain interrupted at least once by oxygen, are very similar to the compounds obtained by the introduction of alkyl groups. Therefore, for the sake of brevity, reference in the hereto appended claims to an alkyl group is intended to include within such expression oxyhydrocarbon radicals of the kind just described, to wit: those in which the carbon atom chain is interrupted at least once by oxygen; but it is not intended to contemplate compounds of the type in which the carbon atom chain is interrupted more than twice by an oxygen atom.

As a matter of common knowledge, reactions involving ammonia and an alkylene dichloride probably go through an intermediate stage, which involves a formation of an aminoalkyl halide. As a result, one has a procedure whereby instead of substituting an alkyl radical for an amino hydrogen atom, one can substitute an aminoalkyl radical. For analogous reactions see U. S. Patent No. 2,014,077, dated September 10, 1935, to Wilson. Thus, what has been previously stated may be modified in the following respect: D, in addition to being an alkyl radical, may also be an aminoalkyl radical.

I have found that the most desirable demulsifiers for my process are obtained by the use of detergent-forming acids of the kind described; and I have particularly found that fatty acids represent the most desirable type of detergent-forming acids. More particularly, the hydroxylated fatty acids represent the most desirable type of fatty acids; and the most desirable specific member of the hydroxylated type is ricinoleic acid. The following are examples of chemical compounds intended to be used as demulsifiers in practising or carrying out my process.

*Example 1*

283 parts of stearic acid amide are heated with 438 parts of triethylene tetramine for 10 hours to about 130° C. until a test portion is soluble in diluted hydrochloric acid; at the end of the reaction the pressure is preferably lowered to about 15 mm. Hg. Thereby 380 parts of a product probably corresponding to the formula $C_{17}H_{35}CONH(C_2H_4NH)_2C_2H_4NH_2$ (monostearyl triethylene tetramine) are obtained.

Example 2

281 parts of oleic acid amide yield with 584 parts of triethylene tetramine, when heated for 10 hours to about 130° C., 400 parts of a product which is soluble in diluted hydrochloric acid and probably corresponds to the mono-oleyl triethylene tetramine.

Example 3

283 parts of stearic acid amide are heated in the same way as described in Examples 1 and 2 with 400 parts of a mixture of polyalkylene polyamines obtainable by heating ethylene dichloride with ammonia under pressure and removing any ethylene diamine formed during the latter reaction. After distilling the excess of bases under reduced pressure, 430 parts of a paste are obtained which is soluble in diluted acids.

Example 4

300 parts of ricinoleic acid amide yield with 400 parts of a mixture of bases according to Example 3, when heated to about 8 hours to 150–160° C., 450 parts of a mixture of acylated bases which is easily soluble in diluted acetic or hydrochloric acid.

Example 5

From 300 parts of ricinoleic acid amide and 400 parts of a mixture of polyalkylene polyamines according to Examples 3 and 4, by heating for several hours to 150° C., simultaneously passing a current of dry air free from $CO_2$, and finally removing the excess of bases partly by distilling under reduced pressure, and partly by washing with water, there are obtained 430 parts of a mixture of polyalkylene polyamines, which is acylated by the radical of ricinoleic acid.

Example 6

100 parts by weight of olive oil and 100 parts by weight of diethylenetriamine are heated to about 180–200° C. until a test portion of the reaction mixture is soluble in dilute hydrochloric acid. After distilling off the excess of diethylenetriamine, advantageously under reduced pressure, there remains a strongly viscous mass, the hydrochloric acid solution of which has great foam forming properties.

A similar product is obtainable by heating free oleic acid with a large excess of diethylenetriamine under the same conditions.

Example 7

310 parts by weight of the ethyl ester of oleic acid are heated with 286 parts by weight of triethylenetetramine at about 160° C. for 12 hours when a homogeneous solution is formed; the alcohol formed and the excess of triethylenetetramine are distilled off. The residual reaction product forms a brown oil, which is difficultly soluble in water and readily soluble in alcohol, benzene and dilute hydrochloric acid.

A quite similar product is obtainable by heating free oleic acid with an excess of triethylenetetramine to about 180–200° C. and distilling off the excess of triethylenetetramine under reduced pressure.

Example 8

200 parts by weight of olive oil are heated at 180–200° C. with 300 parts by weight of a mixture of bases, which is obtained by the action of ammonia on ethylene chloride at 80–120° C. under pressure of 10 atm. and after distilling off the ethylene diamine, said mixture of bases boiling at about 15 mm. mercury between 90 and 300° C. When a test portion of the reaction product is smoothly soluble in dilute hydrochloric acid the water formed and the excess bases are distilled off under reduced pressure and a yellowish brown oil is obtained, a solution of which in dilute hydrochloric acid can be used as a washing or wetting agent.

Example 9

350 grams of monostearin and 300 grams of triethylenetetramine are heated together at 200° C. for three to four hours and then the displaced glycerin and the excess triethylenetetramine were washed out with water and the resulting product dried.

Example 10

In the prior examples tetraethylene pentamine is substituted for the amines employed in the prior examples by using a suitable molecular equivalent, but without increasing the amount of fatty acid compound employed.

Example 11

Purified naphthenic acids derived from Gulf Coast crudes are employed in various examples preceding.

Example 12

Carboxy acids derived from oxides of Pennsylvania crude oil and having approximately 10–14 carbon atoms per mole of fatty acid, are substituted in the previous examples.

As has been previously stated, one may use a suitable carboxy acid or its equivalent, such as an ester, amide, anhydride, acyl chloride, or the like. The acylated polyamine of the kind described may be used as such, or may be used in the form of a salt, such as a hydrochloride, the acetate, or the like.

It is to be understood that the invention herein contemplated is concerned with the use of a particular type of compound or compounds as a demulsifying agent, and is not concerned with the particular means or method employed in the manufacture of said compound or compounds. The methods previously described are those which are most readily employed, and which have been most completely described in the manufacturing art pertaining to such compounds. However, as will be readily apparent to a skilled chemist, other manufacturing procedures may be conveniently employed. Furthermore, it is known that one can obtain symmetrically alkylated alkylene diamines, for instance, symmetrical dibutyl ethylene diamine. Such product can be acylated, for example, by reaction with oleic acid to produce mono-oleyl dibutyl ethylene diamine. Two moles of such a compound might be reacted with a suitable linking reactant such as ethylene dichloride, or the like, so as to unite two such moles to form a new molecule which, on examination, reveals that it has characteristics of the kind required for use as a demulsifier in the herein contemplated process. Various other methods readily suggest themselves, although obviously, one would ordinarily employ the most economical and feasible method.

It is to be understood that the compound herein contemplated may be manufactured in any suitable manner; and one is not dependent upon following the exact procedure previously outlined. In certain instances other reactants might be employed, or else reactants of the kind previously described might be combined in some other manner, it is not intended that the hereto appended claims be limited in any manner whatsoever as to the method of manufacture, unless such method is specifically recited.

Conventional demulsifying agents employed in the treatment of oil field emulsions are used as such, or after dilution with any suitable solvent, such as water-petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of pretroleum, etc., may be employed as diluents. Similarly, the material or compounds employed as the demulsifying agent of my process may be admixed with one or more of the solvents customarily used in connection with conventional demulsifying agents. Moreover, said material or compounds may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or compounds employed as the demulsifying agent of my process.

It is to be noted that the compounds described are basic in character, due to the presence of an unacylated basic amino nitrogen atom. In such instances the compound may be employed as such, or may be employed in basic form (i. e., after combination with water), or may be employed in salt form by reaction with an acid, such as acetic acid, lactic acid, hydrochloric acid, or any other suitable acid.

I desire to point out that the superiority of the reagent or demulsifying agent contemplated in my process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but I have found that such a demulsifying agent has commercial value, as it will economically break or resolve oil field emulsions in a number of cases which cannot be treated as easily or at so low a cost with the demulsifying agents heretofore available.

In practising my process, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with that is commonly known as down-the-hole procedure, i. e., bringing the demulsifier in contact with the fluids of the well at the bottom of the well or at some point prior to their emergence. This particular type of application is decidedly feasible when the demulsifier is used in connection with acidification of calcareous oil-bearing strata, especially if suspended in or dissolved in the acid employed for acidification.

In the hereto appended claims the expressions "amino" and "polyamino" are used in the sense previously indicated, to include amido radicals.

Having thus described my invention, what I claim as new and desire to secure by Letters Patent is:

1. A process for breaking petroleum emulsions of the water-in-oil type, characterized by subjecting the emulsion to the action of a demulsifier comprising a compound of the kind selected from the class consisting of the following type formula:

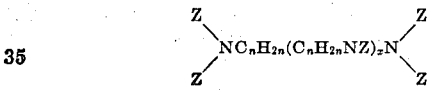

in which $n$ represents a small whole number varying from 2 to 10; $x$ is a small whole number varying from 1 to 10; Z is H, RCO, R'CO, or D, in which RCO represents an acyl radical derived from a higher molecular weight carboxy acid and must occur at least once; R'CO is an acyl radical derived from a lower molecular weight carboxy acid having six carbon atoms or less; and D is a radical selected from the class consisting of alkyl radicals and aminoalkyl radicals; and said amide is further characterized by the fact that there must be at least one occurrence of the following radicals:

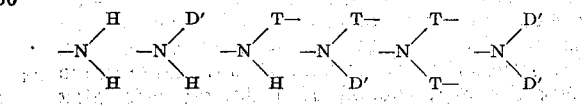

in which T is an alkylene radical and D' is an alkyl radical.

2. A process for breaking petroleum emulsions of the water-in-oil type, characterized by subjecting the emulsion to the action of a demulsifier comprising a strongly basic polyalkylene polyamino amide containing at least three and not more than 11 amino nitrogen atoms; containing at least one amido group and not more amido groups than the number of amino nitrogen atoms present, minus one; the acyl radical of said amido group being the acyl radical of a higher molecular weight carboxy acid; and the alkylene radicals containing at least 2 and not over 10 carbon atoms.

3. A process for breaking petroleum emulsions of the water-in-oil type, characterized by subjecting the emulsion to the action of a demulsifier comprising a strongly basic polyalkylene polyamino amide containing at least 3 and not more than 11 amino nitrogen atoms; containing at least one amido group and not more amido groups than the number of amino nitrogen atoms present, minus one; the acyl radical of said amido group being the acyl radical of a detergent-forming monocarboxy acid; and the alkylene radicals containing at least 2 and not over 10 carbon atoms.

4. A process for breaking petroleum emulsions of the water-in-oil type, characterized by subjecting the emulsion to the action of a demulsifier comprising a strongly basic polyalkylene polyamino amide containing at least 3 and not more than 11 amino nitrogen atoms; containing at least one amido group and not more amido groups than the number of amino nitrogen atoms present, minus two; the acyl radical of said amido group being the acyl radical of a detergent-forming monocarboxy acid; and the alkylene radicals containing at least 2 and not over 10 carbon atoms.

5. A process for breaking petroleum emulsions of the water-in-oil type, characterized by subjecting the emulsion to the action of a demulsifier comprising a strongly basic polyalkylene polyamino amide containing at least 4 and not more than 6 amino nitrogen atoms; containing at least one amido group and not more amido groups than the number of amino nitrogen atoms present, minus two; the acyl radical of said amido group being the acyl radical of a detergent-forming monocarboxy acid; and the alkylene radicals containing at least 2 and not over 10 carbon atoms.

6. A process for breaking petroleum emulsions of the water-in-oil type, characterized by subjecting the emulsion to the action of a demulsifier comprising a strongly basic polyalkylene polyamino amide containing at least 4 and not more than 6 amino nitrogen atoms; containing at least one amido group and not more amido groups than the number of amino nitrogen atoms present, minus two; the acyl radical of said amido group being the acyl radical of a detergent-forming monocarboxy acid; and the alkylene radicals containing at least 2 and not over 4 carbon atoms.

7. A process for breaking petroleum emulsions of the water-in-oil type, characterized by subjecting the emulsion to the action of a demulsifier comprising a strongly basic polyethylene polyamino amide containing at least 4 and not more than 6 amino nitrogen atoms; containing at least one and not more amido groups than the number of amino nitrogen atoms present, minus two; the acyl radical of said amido group being the acyl radical of a detergent-forming monocarboxy acid.

8. A process for breaking petroleum emulsions of the water-in-oil type, characterized by subjecting the emulsion to the action of a demulsifier comprising a strongly basic polyethylene polyamino amide containing at least 4 and not more than 6 amino nitrogen atoms; containing at least one and not more amido groups than the number of amino nitrogen atoms present, minus two; the acyl radical of said amido group being the acyl radical of a detergent-forming monocarboxy acid; and said acyl radical being derived from a fatty acid having at least 8 and not more than 32 carbon atoms.

9. A process for breaking petroleum emulsions of the water-in-oil type, characterized by subjecting the emulsion to the action of a demulsifier comprising a strongly basic polyethylene polyamino amide containing at least 4 and not more than 6 amino nitrogen atoms; containing at least one and not more amido groups than the number of amino nitrogen atoms present, minus two; the acyl radical of said amido group being the acyl radical of a detergent-forming monocarboxy acid; and said acyl radical being derived from an unsaturated fatty acid having at least 8 and not more than 32 carbon atoms.

10. A process for breaking petroleum emusions of the water-in-oil type, characterized by subjecting the emulsion to the action of a demulsifier comprising a strongly basic polyethylene polyamino amide containing at least 4 and not more than 6 amino nitrogen atoms; containing at least two and not more amido groups than the number of amino nitrogen atoms present, minus two; the acyl radical of said amido groups being the acyl radical of a detergent-forming monocarboxy acid; and said acyl radical being derived from an unsaturated fatty acid having at least 8 and not more than 32 carbon atoms.

11. A process for breaking petrolem emulsions of the water-in-oil type, characterized by subjecting the emulsion to the action of a demulsifier comprising an acylation derivative of triethylene tetramine containing 2 amide groups, in which the acyl radicals of said amido groups are the acyl radicals of an unsaturated fatty acid having at least 8 carbon atoms and not more than 32 carbon atoms.

12. A process for breaking petroleum emulsions of the water-in-oil type, characterized by subjecting the emulsion to the action of a demulsifier comprising an amidification derivative of tetraethylene pentamine.

13. A process for breaking petroleum emulsions of the water-in-oil type, characterized by subjecting the emulsion to the action of a demulsifier comprising an amidification derivative of pentaethylene hexamine.

CHARLES M. BLAIR, Jr.